United States Patent [19]

Oki et al.

[11] Patent Number: 5,319,722
[45] Date of Patent: Jun. 7, 1994

[54] NEURAL NETWORK FOR CHARACTER RECOGNITION OF ROTATED CHARACTERS

[75] Inventors: Toru Oki, Allendale; Philip A. Paolella, Fort Lee, both of N.J.

[73] Assignee: Sony Electronics, Inc., Park Ridge, N.J.

[21] Appl. No.: 955,555

[22] Filed: Oct. 1, 1992

[51] Int. Cl.⁵ .......................... G06K 9/32; G06K 9/20; G06K 7/10
[52] U.S. Cl. ........................... 382/46; 382/44; 382/68; 382/14; 235/454
[58] Field of Search .................. 382/44, 45, 46, 1, 10, 382/41, 68, 65-67; 395/137, 138, 139; 340/727; 235/459, 464; 369/58; 345/126

[56] References Cited

U.S. PATENT DOCUMENTS

| | | | |
|---|---|---|---|
| 3,050,711 | 8/1962 | Harmon | 382/68 |
| 3,701,098 | 10/1972 | Acker | 382/46 |
| 3,967,243 | 6/1976 | Kawa | 382/46 |
| 4,040,009 | 8/1977 | Kadota et al. | 340/146.3 |
| 4,267,573 | 5/1981 | Chaikin et al. | 382/46 |
| 4,395,699 | 7/1983 | Sternberg | 382/41 |
| 4,491,960 | 1/1985 | Brown | 382/26 |
| 4,748,676 | 5/1988 | Miyagawa et al. | 382/46 |
| 4,893,346 | 1/1990 | Bishop | 382/8 |
| 4,922,543 | 5/1990 | Ahlbom et al. | 382/46 |
| 4,933,872 | 6/1990 | Vandenberg et al. | 364/513 |
| 4,965,725 | 10/1990 | Rutenberg | 364/413.1 |
| 4,972,499 | 11/1990 | Kurosawa | 382/38 |
| 5,046,020 | 9/1991 | Filkin | 364/513 |
| 5,048,097 | 9/1991 | Gaborski et al. | 382/14 |
| 5,052,043 | 9/1991 | Gaborski | 382/14 |
| 5,054,094 | 10/1991 | Barski | 382/18 |
| 5,060,276 | 10/1991 | Morris et al. | 382/46 |
| 5,060,278 | 10/1991 | Fukumizu | 382/14 |
| 5,067,164 | 11/1991 | Denker et al. | 382/15 |
| 5,091,965 | 2/1992 | Kobayashi et al. | 382/15 |
| 5,093,899 | 3/1992 | Hiraiwa | 395/23 |
| 5,105,468 | 4/1992 | Guyon et al. | 382/14 |
| 5,119,438 | 6/1992 | Ueda et al. | 382/14 |
| 5,129,039 | 7/1992 | Hiraiwa | 395/24 |
| 5,157,738 | 10/1992 | Carpenter et al. | 382/15 |
| 5,161,204 | 11/1992 | Hutcheson et al. | 382/16 |
| 5,214,746 | 5/1993 | Fogel et al. | 395/23 |

OTHER PUBLICATIONS

1990 Int'l. Conf. on Acoustics Speech & Signal Processing, vol. 4, pp. 2125-2128, "Chinese Char. Recog. w/Neural Nets Class.", Jeng et al.
Int'l. Conf. on Pattern Recognition, pp. 35-40, 06/16-21/90, "Handwritten Zip Code Recog. w/Multilayer Networks", Cun et al.
2nd Int'l. Conf. on Artifical Neural Networks, pp. 214-218, 18-20/11/91, "Segmentation & Recog of Calligraphic Text", Bruyne et al.
IEEE Int'l. Conf. on Neural Nets, pp. 125-132. vol. 1, 24-27/07/88, "Invariant Pattern Recog. by Means of Fast Synap. Plast.", Buhmann.
IEEE Int'l. Conf. on Neural Nets, pp. 625-632, vol. 1. 24-27/07/88, "Dist. Invar. Char. Recog. by Multi-Layer per.", Khotanzad et al.
Cognex Corp., Board-Level Machine Vision Systems, 2000/3000/4000 Technical Descript., 1990, USA.
IJCNN-Int'l. Joint Conf. on Neural Nets, 17-21/06/90, pp. 733-738, "Adaptive Input Field Neural Network", M. Asogawa.
Dr. Dobb's Journal, pp. 139-143., Jun. 1992, "Graphics Programming, Fast Antialiasing".

Primary Examiner—Michael T. Razavi
Assistant Examiner—David Fox
Attorney, Agent, or Firm—Jerry A. Miller

[57] ABSTRACT

A process for converting characters arranged circularly, as for example about the center hole of a compact disk, into a linear arrangement. Points are assigned to locations on the circular arrangement. These points are mapped to a linear arrangement. The number of points is selected to be greater than those of the original image to enhance the resolution of the resulting image. The location of the points is stored in an address array. The values of the pixels in the original image are then copied to a target array. The pixel values are then converted to binary values serving as input to a recognition neural network and a verification neural network.

1 Claim, 9 Drawing Sheets

RECOGNITION

VERIFICATION

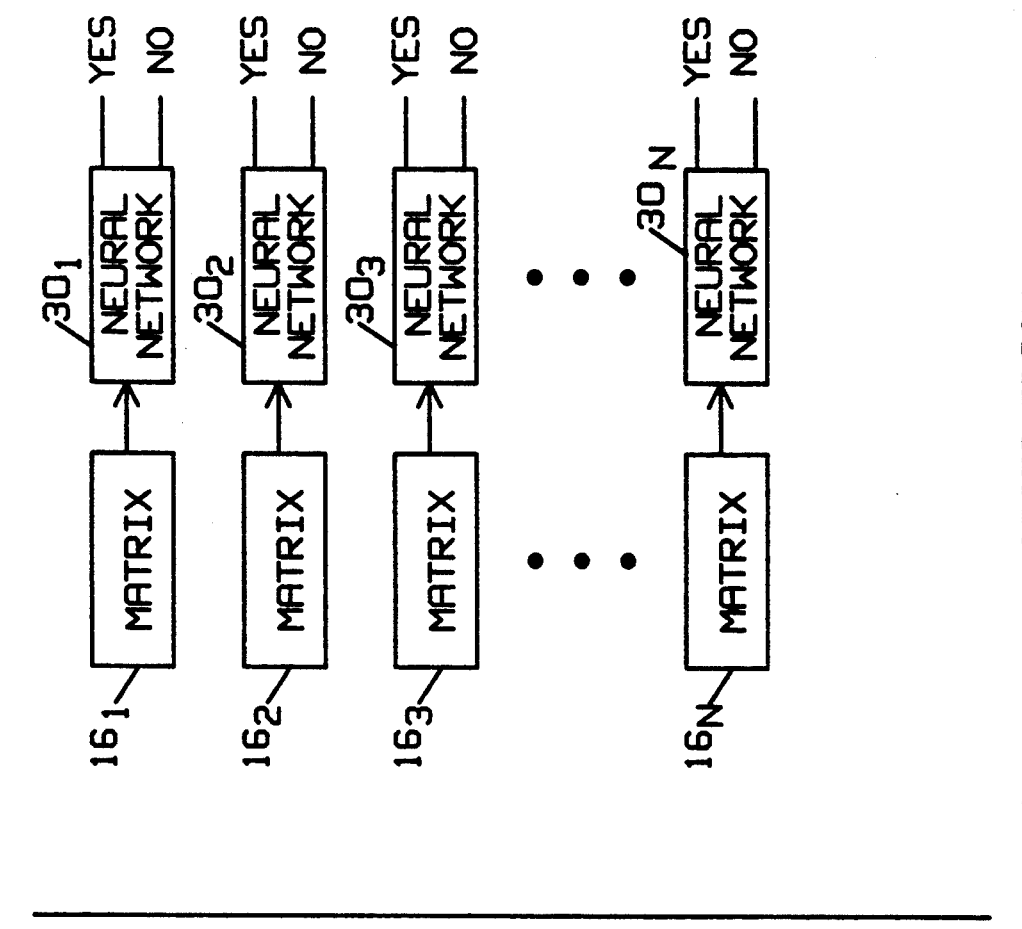
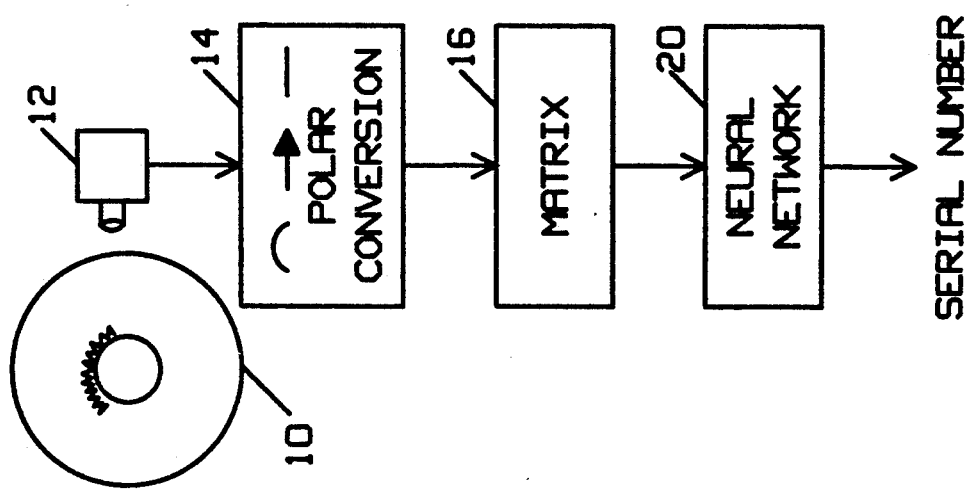
FIG. 2

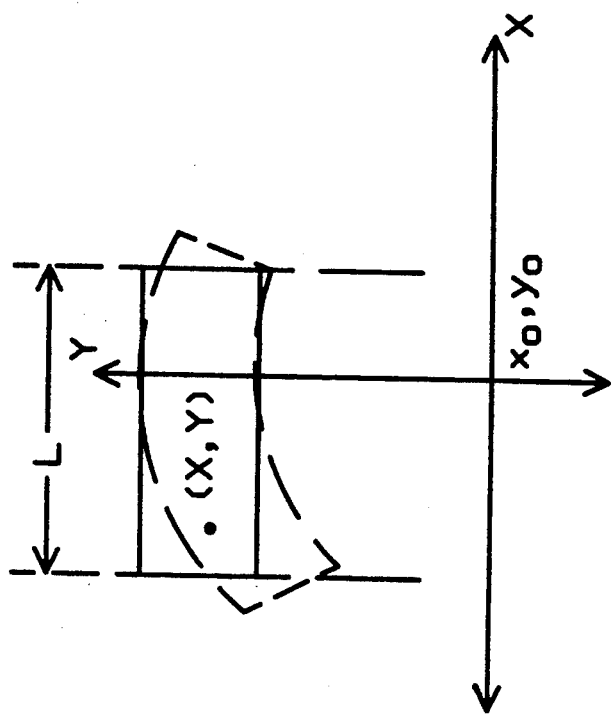
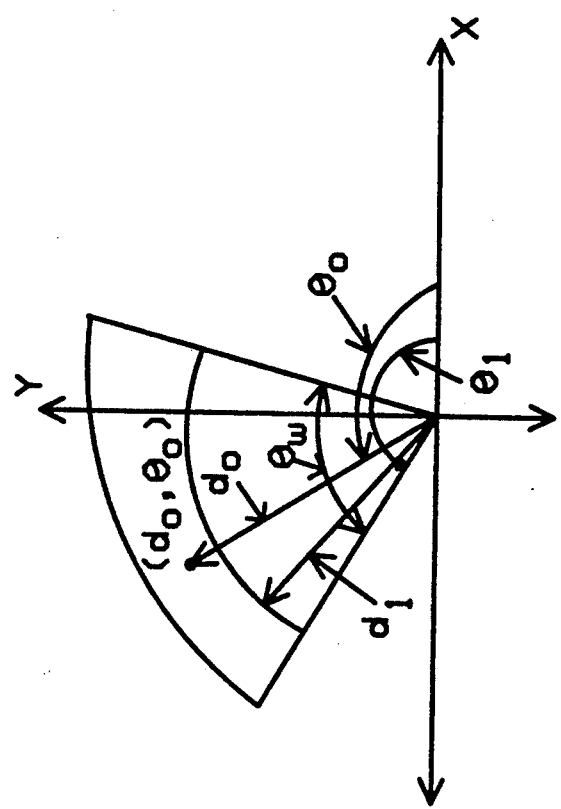
FIG. 5

NEURAL NETWORK FOR CHARACTER RECOGNITION OF ROTATED CHARACTERS

CROSS REFERENCE TO RELATED DOCUMENTS

This application is related to copending commonly owned applications filed of even date herewith as follows: Ser. No. 07/955,563 entitled "Training Method for Neural Networks Using Character Width Variation" of Toru Oki; Ser. No. 07/955,522 entitled "Training Method for Neural Network Using Offset Training Characters", of Toru Oki; Ser. No. 07/955,534 entitled "Neural Network for Character Recognition and Verification", of Toru Oki; and Ser. No. 07/955,526 entitled "Training Method for Neural Network" of Toru Oki and Philip Paolella. These applications are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of neural networks used for character or symbol recognition. More particularly, this invention relates to a method and apparatus for recognition of characters or symbols which are rotated, as for example around the center hole of a compact disk or in a circular arrangement on a can or bottle.

2. Background of the Invention

Character recognition is an important application of neural networks. Character recognition applications are used for recognition of text in documents as well as recognition of symbols and characters in industrial applications. In all applications, optimal accuracy in recognition of the characters is of great importance. An overview and background treatment of the various factors affecting neural network performance and training can be found in a paper entitled "Foundations of Neural Networks" by Patrick K. Simpson, published in *Artificial Neural Networks: Paradigms, Applications and Hardware Implementations*, edited by Sanchez-Sinencio et al., IEEE press, 1992, USA.

In conventional neural networks, both hardware and software, characters are recognized by providing a representation of the character to a neural network. Internal weighting functions are used to produce an output representative of the most likely character based upon a training process for training the network. Improving the quality of the training process is the subject of a large body of current research and currently determines the accuracy with which the neural network can identify the characters. In industrial applications, correct recognition of characters representing, for example, serial numbers can be critical to production control.

In some instances, serial numbers, alphabetical or numerical characters, graphic symbols, bar codes, or other characters to be recognized, are provided in a circular arrangement. An example of this is the serial number which is commonly found around the central aperture of a compact disk. Correct reading of such characters is substantially more complex than reading characters in a linear arrangement. The present invention seeks to enhance reading such characters by providing a technique for rearranging the characters in a linear arrangement, segregating and centering the characters.

SUMMARY OF THE INVENTION

It is an object of the present invention to provide an improved character or symbol recognition method and apparatus for reading characters or symbols having an approximately circular arrangement.

It is an advantage of the present invention that accuracy of recognition of characters or symbols arranged in a circular configuration is enhanced.

It is a feature of the invention that the resolution of the transformed character can be enhanced to more accurately represent the rotated character.

These and other objects, advantages and features of the invention will become apparent to those skilled in the art upon consideration of the following description of the invention.

The present invention relates to a process for converting characters arranged circularly, as for example about the center hole of a compact disk, into a linear arrangement. Points are assigned to locations on the circular arrangement. These points are mapped to a linear arrangement. The number of points can be selected to be greater than the number of pixels of the original image to enhance the resolution of the transformed image. The location of the points is stored in an address array. The values of the pixels in the original image are then copied to a target array. The pixel values are then converted to binary values serving as input to a recognition neural network and a verification neural network.

According to an aspect of the invention, a method for recognition of characters, includes the steps of: receiving a circular representation of a character arranged in a circular configuration; transforming the circular representation of the character to a linear configuration to produce a linear representation of the character; and performing a character recognition process upon the linear representation of the character.

Another method of the invention for transforming a circularly arranged character to a linearly arranged character, includes the steps of: generating a plurality of address locations for sampling pixel values making up the circularly arranged character; sampling the pixel values of the circularly arranged character; and constructing the linearly arranged character from the sampled values.

A apparatus according to the invention for recognizing a circularly arranged character, includes a generator which generates a plurality of address locations for sampling pixel values making up the circularly arranged character. A sampler samples the pixel values of the circularly arranged character. A linearly arranged character is constructed from the sampled values; and a neural network, receiving the linearly arranged character, is used for recognizing the character.

The features of the invention believed to be novel are set forth with particularity in the appended claims. The invention itself however, both as to organization and method of operation, together with further objects and advantages thereof, may be best understood by refer-

BRIEF DESCRIPTION OF THE DRAWING

FIG. 2 is a block diagram illustrating the operation of the character recognition and verification system of the present invention.

FIG. 5 illustrates the polar conversion of the present invention.

DETAILED DESCRIPTION OF THE INVENTION

Figure 1:
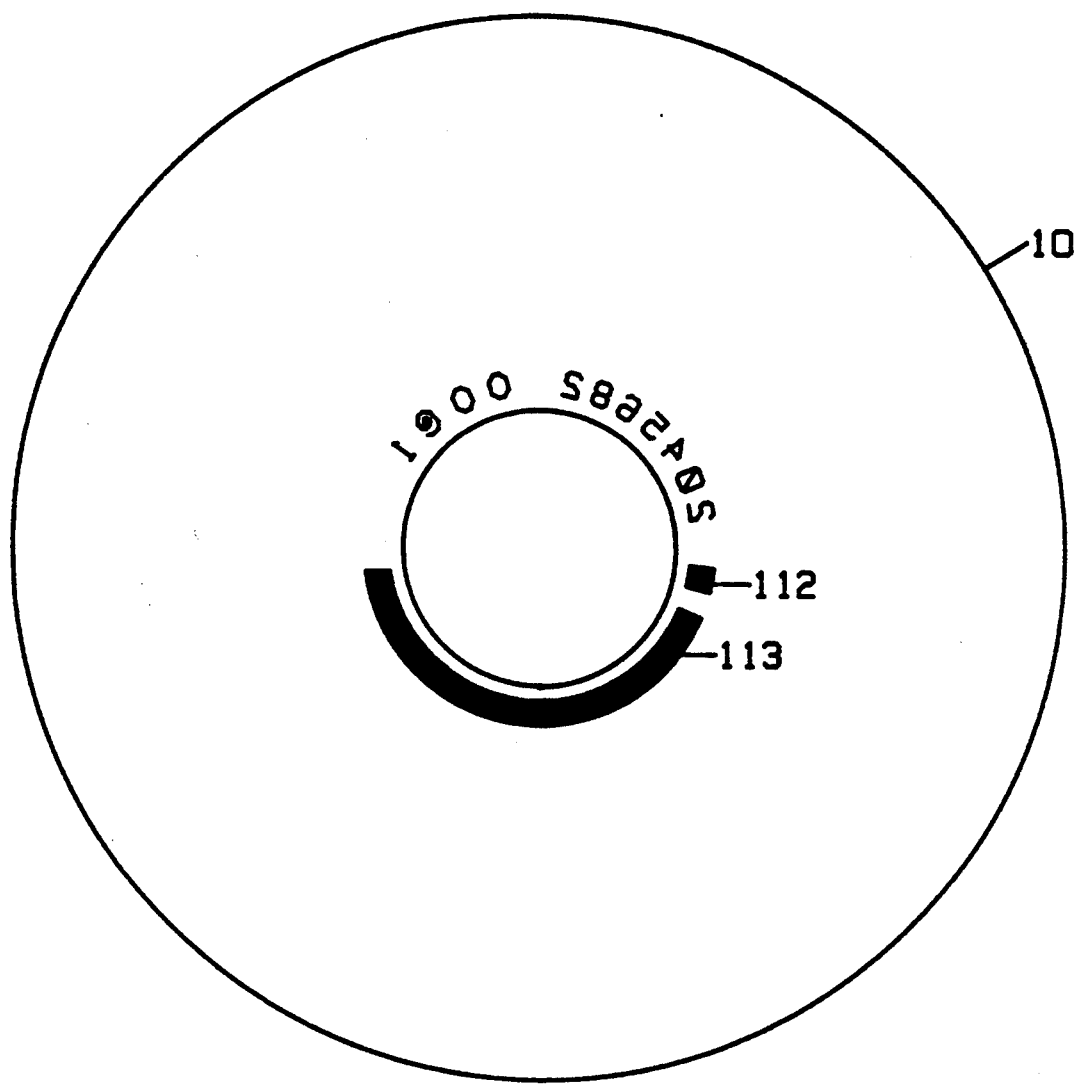
FIG. 1 is a diagram of a compact disk having a serial number about the central aperture thereof.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. For purposes of the present description, the term symbol and character will be used somewhat interchangeably with each intended to represent a member of a set of recognizable set members such as numbers, letters, graphic symbols, alphabet symbols or the like.

Turning now to FIG. 1, an example industrial application of the present invention is disclosed. Such an application might be used to recognize a serial number on a part, such as for example, a subassembly, a computer disk, or a compact disk, etc. Of course, other applications are possible. In this example, assume that an eleven character Ser. No. (204568200@1) is to be recognized from a part 10, which in the preferred embodiment is a compact disk. In the preferred embodiment, the serial number is also viewed through the disk's transparent substrate so that the characters are inverted as shown. Of course, this simply requires that the neural network used for recognition in this system is trained to recognize reversed characters.

Referring to FIG. 2, this part 10 is viewed in a particular location by a video camera or other scanning device 12. In the case where part 10 is a compact disk or otherwise has a circular arrangement, the serial number encircles the central aperture of the disk. This makes recognition of the characters more difficult. The output of the camera 12 is analyzed by a polar converter 14 so that the arrangement of the characters is converted from the circular arrangement around the central aperture into a linear sequence of characters which are segregated from each other and centered as described more fully below. The linear sequence of characters is then represented as a matrix 14 (or collection of matrices) representing each of the characters. Typically, the matrix is made up of a binary representation of pixel values which represent the character being viewed as described in the copending application incorporated above. Thus, each pixel is either a 1 or a 0, but this is not to be limiting since analog values could also be provided as an input to an appropriately designed neural network. In the present invention, the pixel values start off as analog values and are later conerted to either a binary 1 or 0.

The matrix 14 is used as an input to a more or less conventional neural network 20 which is trained to recognize characters or symbols from a predetermined character or symbol set (e.g., the alphabet and digits 0–9, plus selected symbols such as @, *, #, etc.). If the characters are correctly recognized by the network 20, the correct serial number is output.

The serial number output from the neural network 20 as shown in the example is an eleven character code. Of course, in general any number of characters could be processed. To verify the serial number in this example, a neural network 30 ($30_1 \ldots 30_N$) is selected corresponding to each of the characters of the serial number. Each such neural network is then provided with matrix $16_1 \ldots 16_N$ for analysis as described in the copending application.

Each of these neural networks 30 can be substantially less complex than the neural network 20 and each is trained to recognize a single member of the character or symbol set. That is, each neural network 30 is trained to recognize only (1) a single character and (2) not that character. Thus, a network $30_b$ is trained to give a "yes" or "no" answer to whether the character being analyzed is a letter "b". To do so, the network is taught that "b" is the correct answer if the input is an image of the letter "b", and that "not b" is the correct answer if the input is an image of "a", "c"–"z", or "0"–"9".

Figure 3:
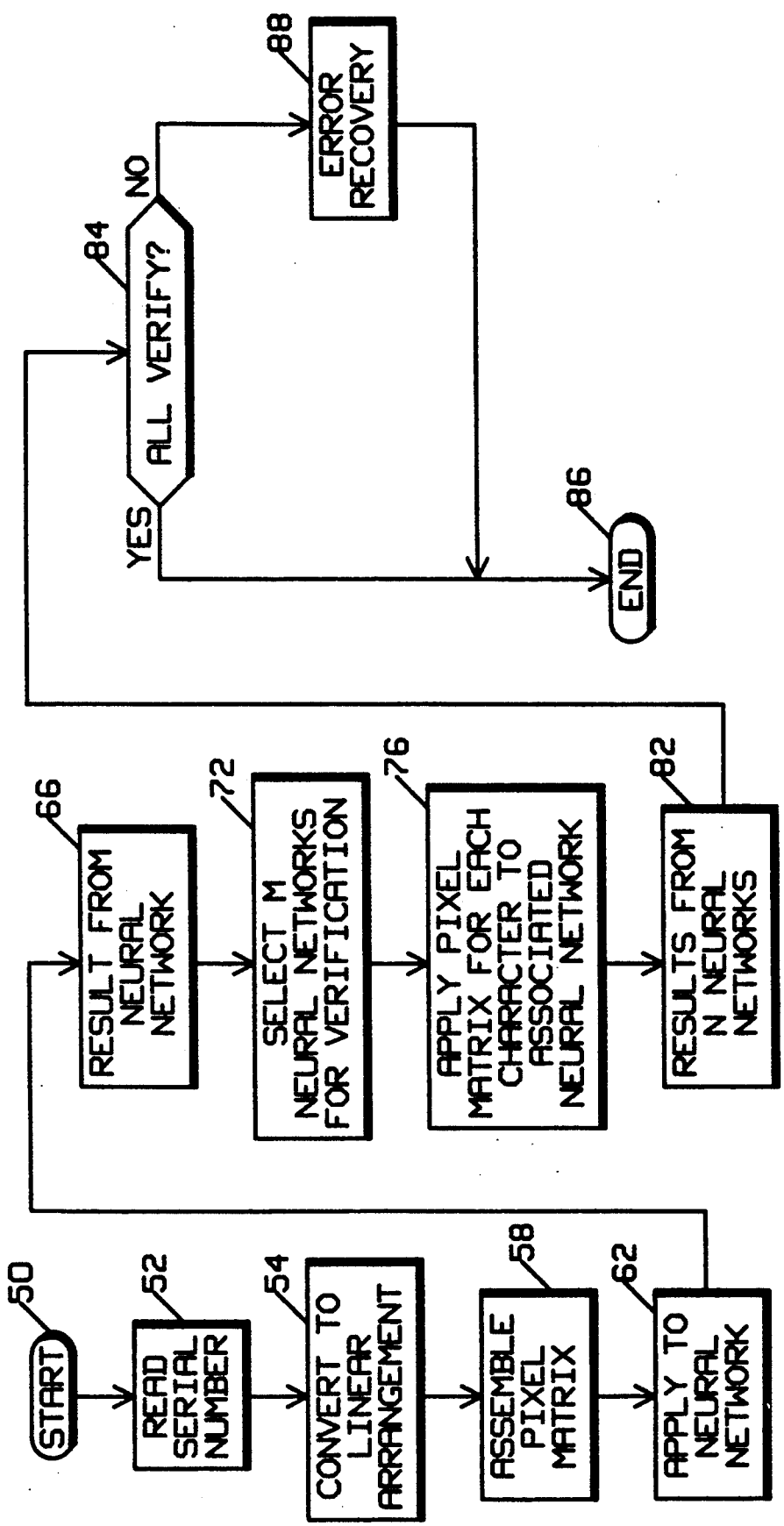
FIG. 3 is a flow chart of the operation of character recognition and verification system according to the present invention.

Turning now to FIG. 3, the present recognition and verification process is summarized in the form of a flow chart starting at step 50. At step 52 the serial number is scanned from part 10 to create an image representation usable by a computer or neural network circuit. Recall that for the compact disk embodiment, the serial number is arranged in a semicircle around the center aperture of a compact disk. At step 54, the image is manipulated to convert the semicircular character arrangement into a linear arrangement by rotating each character to a more readily readable arrangement and segmented into individual symbols as described below.

At step 58, a matrix is assembled containing the rotated (polar converted) characters. In general, it is desirable to isolate each character at this point into a separate matrix of pixels using the technique to be described for further processing. This matrix is then applied to a neural network at step 62, which is trained to recognize the members of an appropriate set of N characters or symbols. The neural network then produces a result at step 66 containing the network's best estimation of the value of each of the M characters or symbols of the serial number.

At step 72, a set of M smaller neural networks, one for each recognized symbol of the serial number, is selected from a collection of N such neural networks. Each of the N neural networks is trained to give only a "yes" or "no" answer in recognition of a single one of the N characters in the total character set. Each of the N neural networks is thus associated with recognition of a single character in the set.

At step 76, each of the individual matrices associated with a character in the serial number is associated with one of the M neural networks selected in step 72 so that the character image as represented by the pixel matrix for each character of the serial number is applied to a verification neural network associated with each recognized character from step 66. Each of the smaller M neural networks then analyzes the individual characters and provides a result at step 82 indicative of whether or not each character is believed to be correctly recognized. If all M characters of the serial number are correctly recognized at step 84, the process ends at 86. If all characters cannot be verified at step 84, an error recovery procedure can be instituted at step 88 prior to ending at 86.

Figure 4:
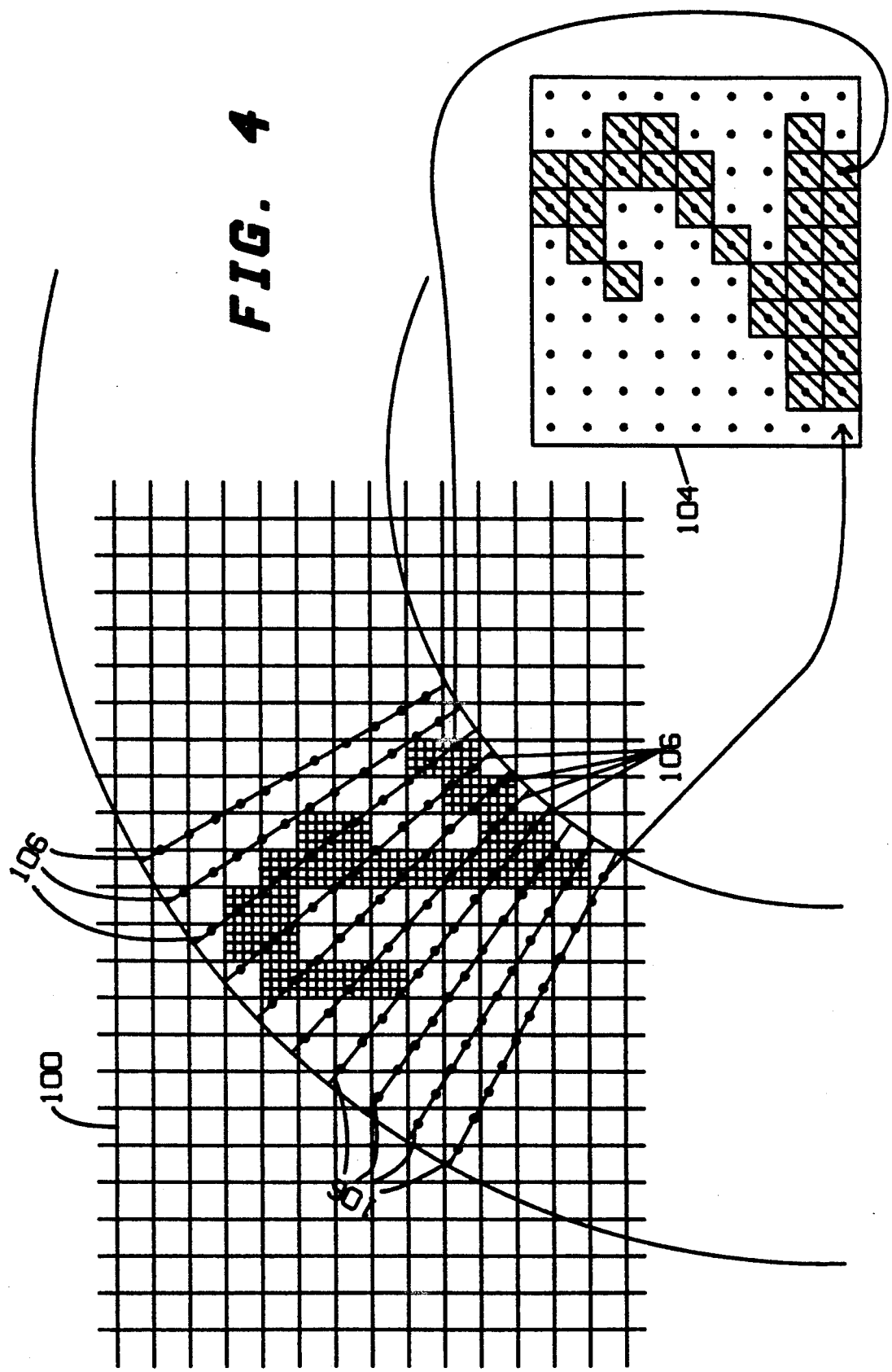
FIG. 4 is an illustration of the mapping of pixels from the circularly arranged image to a linear array of pixels.

Referring to FIG. 4, viewed in conjunction with FIG. 5, the polar conversion process of step 54 which rotates the characters to a linear arrangement is described in greater detail. There are several ways that the conversion can be carried out. First consider the basic mapping function without the preferred resolution enhancement. In FIG. 4, a number "2" is shown in a polar arrangement around the center hole of a compact disk. The character is made up of a number of square pixels in FIG. 4 (although in general the pixels are rectangular as will be clarified later). Note that the orientation of the pixels forming the character are part of a large grid 100 of pixels arranged in a linear array such as that which is produced by a video camera. The orientation of the serial number is not necessarily optimal for representation by this arrangement of pixels. This may be particularly the case when the serial number characters make up a relatively small portion of the image. Thus, the character is represented somewhat grossly by pixels oriented according to the relative position of the part 10 and the camera 12. The character's poor alignment with the pixel orientation may be easier to visualize by rotating FIG. 4 approximately 45 degrees so that the "2" is oriented more closely to horizontal text. In this position, the pixels appear as diamonds.

Figure 9:
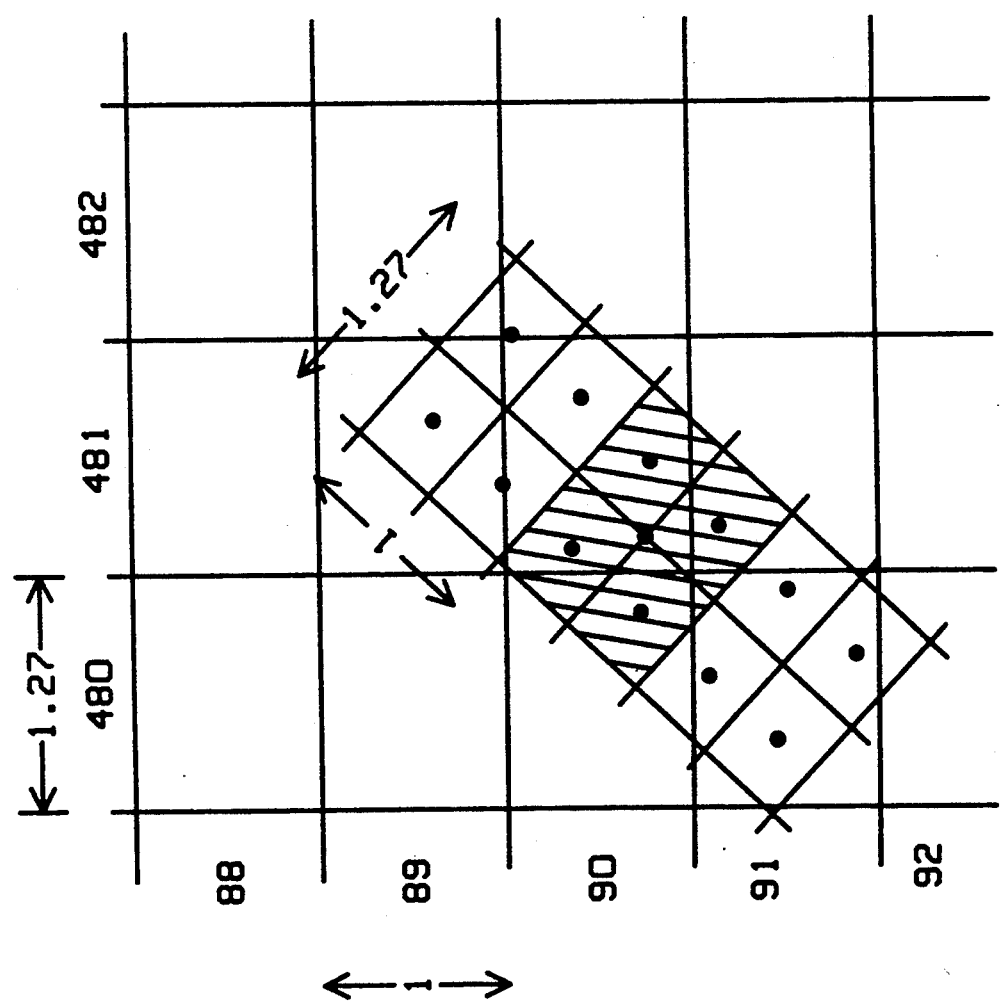
FIG. 9 shows the overlay of the enhanced resolution pixels with the original image pixels.

An object of the invention is to map this arrangement of pixels into a rectangular arrangement of pixels 104 rather than the circular arrangement of the subject image. Since the orientation of the pixels in grid 100 is rotated from that of the pixels in the target arrangement of pixels 104, there is an amount of skewing and distortion of the mapped character. To understand the mapping process and the resulting distortion, it is helpful to visualize an imaginary polar grid of pixels arranged in a polar configuration made up of radial lines and concentric circles. The center line of each radial column of pixels is shown as dots along the radial lines 106. To avoid further cluttering of FIG. 4, the actual imaginary grid has not been shown in this figure. (A small portion of the imaginary grid with resolution enhancement is shown in FIG. 9. The grid can be constructed by creating a plurality of concentric arcs about the center of the center aperture of the compact disk intersecting points between the dots and an additional set of radial lines extending from the center point between those shown.) These dots can be viewed as sampling points. The original circular image is sampled at these points and the sample values copied into a corresponding location in a target array 104. Each pixel in the original image is assigned an address corresponding with the (x,y) location of this sampling point and the point is then mapped to the target array 104.

In the mapping process, the center of each of the dots along the radial lines maps to a pixel value in the target array 104. By examining each dot location and the resulting pixel in the target array 104, the source of the distortion can be understood since the value of a pixel in the original image is only mapped as a pixel value in the target array 104 if the dot representing the center of the imaginary polar grid is within a given pixel in the original image. It will be understood that the greatest amount of distortion is likely to occur when the character is centered at about 45 degrees from horizontal or vertical and comparatively less when the character is near vertical or near horizontal. The distortion is largely due to the character making up only a small part of the whole image produced by the camera. Thus, only a few of the pixels making up the array 100 forms each character. The new rotated characters of the target array are thus made up of pixels in a different orientation than those of the original image.

To produce one dot (sampling point) for each pixel in the image, the radial lines should be spaced apart by one pixel times the aspect ratio of the pixels. In the test embodiment, the pixels are rectangular and have an aspect ratio of 1.27. Thus, each radial line is spaced by 1.27 pixels if the circle is measured in pixels (assuming no increase in resolution is used). Note that this means that the spacing of the pixels, and thus the radial lines, varies slightly around the circle depending upon the aspect ratio of the pixels.

$\Delta\theta$ is the angular increment used for successive calculations of the current angle during the polar transformation process. For instance, the first angle used in the polar transformation calculation is simply the start angle. After the radial calculations are made along the start angle, the new angle is the start angle plus $\Delta\theta$. Again, radial calculations are made along this angel and again the current angle is updated by adding $\Delta\theta$. In this manner, the current angle used in the loop is always the start angle plus an integer multiple of $\Delta\theta$.

The calculation of $\Delta\theta$ follows from the small angle approximation (sin(z) approximately equals z for small angles) and is adjusted by the aspect ratio of the pixels A (which is 1.27 for the hardware used in the test embodiments) which is used to account for the rectangular shape of the pixels. (A pixel for this hardware is defined as having height in the y-direction of 1 unit and in the x-direction of 1.27 units.) The radius to the center of the arc being transformed for the hardware of the test embodiment is 220 y pixels which equals 220/1.27=173.238×pixels. $\Delta\theta$ is the angle determined by an arc length of one x-direction pixel. This is because pixels along the arc will be mapped to the horizontal and pixels along the radius will be mapped to the vertical. Thus, radial pixels will be measured in one unit, or y-direction size pixels. Since $\Delta\theta$ is approximately equal to $\sin(\Delta\theta)$ and $\sin(\Delta\theta)$ is approximately equal to the arc length divided by the radius:

$$\sin(\Delta\theta) \approx \frac{1.27 \text{ y direction pixels}}{220 \text{ y direction pixels}} = 0.0057727$$

alternatively $$\sin(\Delta\theta) = \frac{1 \times \text{direction pixel}}{173.228 \times \text{direction pixels}} = 0.0057727$$

Since the chosen unit of measurement is the y-direction height of one pixel, and since all pixels along the radius will be mapped to successive rows of the target area, the spacing of points along the radius is simply one unit.

Once the angle and range have been determined, an array is prepared for holding the addresses created during the polar transformation. This is illustrated as the address array in FIG. 6. For example, if the range is 45 degrees, which corresponds to (45 2 pi r)/360 or 136 x-direction pixels, where r=220/1.27=173.228 pixels in the x-direction, the number of columns in the address array is also 136. If the arc width is 32 y-direction pixels, the number of rows in the address array is 32. The contents of the address array is the addresses calculated during the polar transformation.

Figure 6:
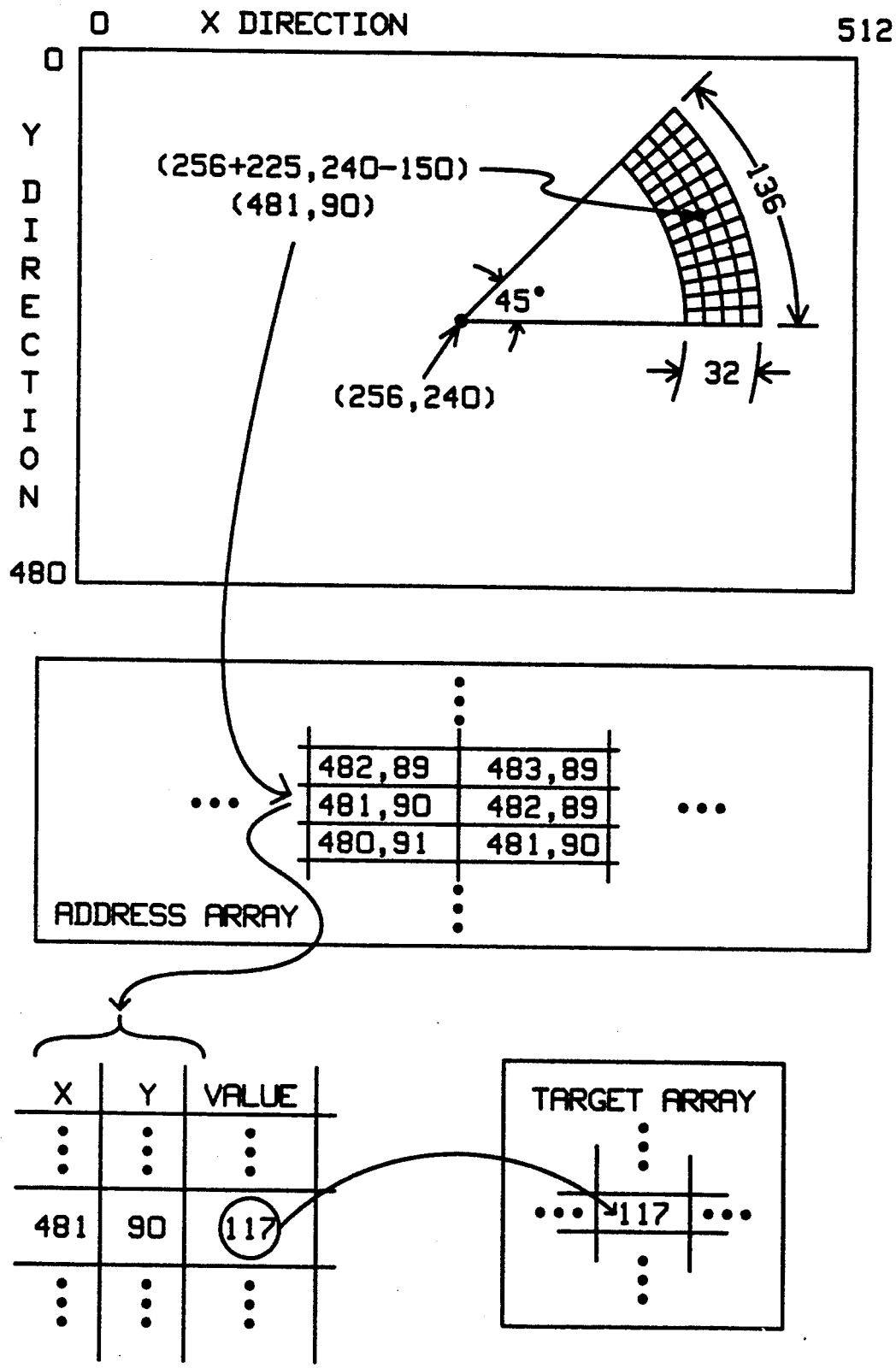
FIG. 6 illustrates the mapping process of the address array and the target array.

Once these addresses are stored, the location on the original image in which a pixel value can be retrieved is determined. Thus, the next step of the transformation process is simply looking at the corresponding pixel location for the address in the address array and copying the pixel value to the target array as illustrated in FIG. 6. In this figure, the pixel of interest is located at position (481, 90). This address is stored in the address array in the position associated with that pixel in the target array. Then, for each position in the address array, the pixel values are copied from the original image (or a computer file containing a representation of the original image) into the target array by simply looking up the value associated with the address.

In order to calculate the polar address that is stored in the address array, first the x and y address is calculated and stored in the address array. Then, the address of the screen center is factored in as an offset. This is done by adding the screen center to the x projection of the point and subtracting the y projection from the screen center (because the origin is considered to be the upper left corner of the screen. Recall that x pixel dimensions are divided by the aspect ratio (1.27 in the test embodiment) and the y pixel dimensions are used for the y-direction calculations.

In the test embodiment, the rotated image is copied to an area of the screen which does not interfere with the serial number on the compact disk. In this example, an area 32 pixels by 136 pixels is selected. The transformation process proceeds by selecting an element from the address array, getting an address of a screen pixel and copying the gray scale value for that pixel into the target array. These steps are repeated for each pixel addressed in the address array.

In the preferred embodiment, the pixels from the camera are stored as brightness values represented as a value from 0 to 127 (a representative of the gray scale). Once the image has been rotated by the polar process of the present invention, each pixel value is compared with a predetermined threshold to determine if it is best represented as a binary 0 or 1. In the test embodiment, the threshold used was 70 with numbers greater than 70 being assigned a 1 value and numbers less than 70 being assigned a 0 value. The exact threshold, however, is highly dependent upon numerous factors such as lighting of the image, sensitivity of the camera and other hardware factors. The exact threshold is best determined experimentally with the particular hardware and lighting conditions.

Figure 7:
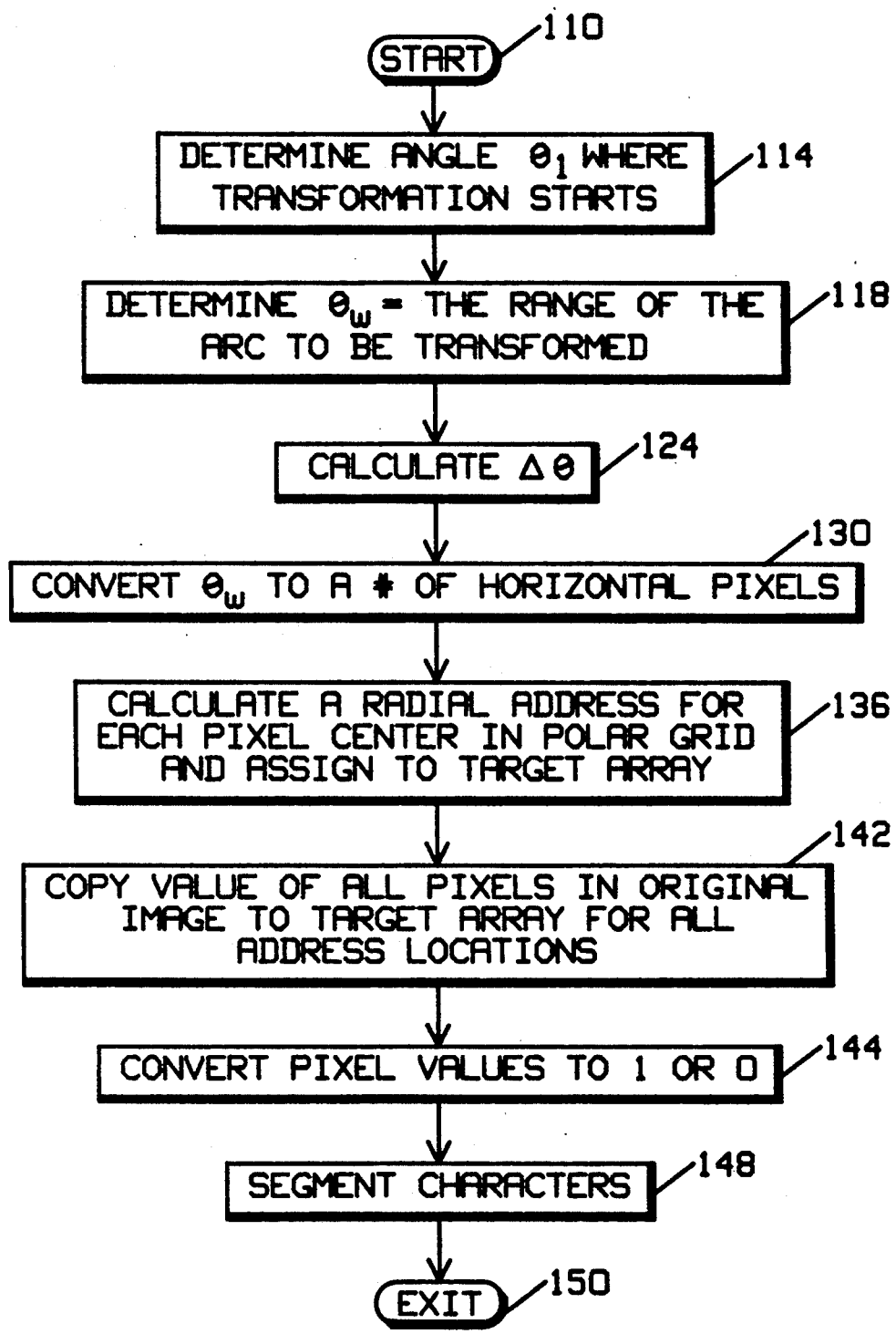
FIG. 7 is a flow chart describing the polar conversion of the present invention.

Turning now to FIG. 7, which is more easily understood if viewed in conjunction with FIG. 5, a flow chart of the conversion process described above of the present invention starts at step 110. At 114 the angle $\theta_1$ is determined by searching for a reference point on the compact disk. This could also be done manually or using other techniques which will occur to those skilled in the art. In the preferred embodiment, the serial number is known to always begin shortly after the short square 112 following the arc 113 encircling the aperture as shown in FIG. 1. At step 118, the range of the arc to be transformed $\theta_x$ is determined by any suitable process. The range of the arc to be converted in this application is always known to be 85 degrees. At step 124, $\Delta\theta$, the spacing between adjacent radial lines 106, is calculated as:

$$\Delta\theta = \frac{A}{d}$$

where $A$ is the aspect ratio of a pixel and $d$ is the radius

At step 130, the range $\theta_x$ is converted to a number of horizontal pixels making up the range of the arc using the equation:

$$Q = \frac{\pi(\text{range}^o)}{360\Delta\theta} = \text{No. of pixels in an arc}$$

The number of vertical pixels, in this application, are fixed due to the constant width of the arc being converted. In other applications, this may not be the case, in which case the width would also be computed. At step 136, the radial address for the center of each pixel in the imaginary polar grid is calculated as x and y coordinates using:

$$x = d\cos\theta_O + X_O$$

$$x = y_O - d\sin\theta_O$$

Once these x and y coordinates are calculated, they are assigned respective places in the rectangular target grid. At step 142, the values of all pixels at the computed x and y coordinates of the original image are copied to the target rectangular grid. At this point, the pixels are in the form of a digitized analog brightness value ranging from 0 to 127. For the binary input neural network of the preferred embodiment, these brightness values are converted at step 144 to "binarized" pixels having either a 0 or 1 representing their value. The characters are then segmented and centered at step 148.

Once the characters are converted to a linear arrangement, the characters are segmented and centered at step 148. Correct centering of the characters results in improved accuracy of recognition or verification. Centering is accomplished as illustrated in FIG. 7. As illustrated for an example letter "A", the left and right edges of the character are located by detecting an increase or decrease in the number of pixels lighted in a given row or column of pixels beyond a predetermined threshold. The left edge is denoted as $x_1$ and the right edge as $x_2$. The location of the center of the character is then approximated by $(X_2 - x_1)/2$. In a similar manner, the top ($y_2$) and bottom ($y_1$) of the character is located and the center of the character is approximated by $(y_2 - y_1)/2$.

Figure 8:
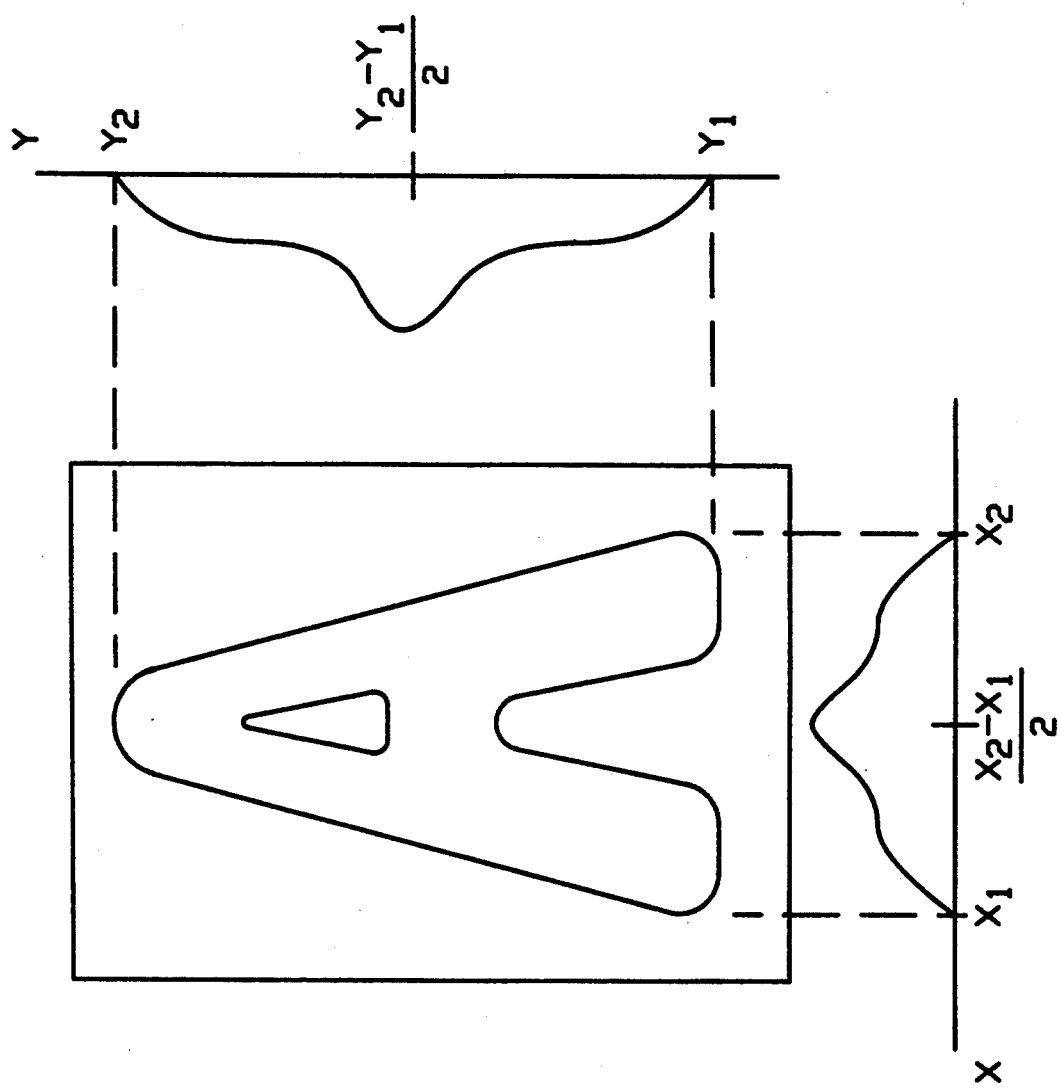
FIG. 8 illustrates the segmentation and centering of a character.

In the test embodiment, the characters are centered by finding $x_1$ and $x_2$ in accordance with the x projection shown in FIG. 8. First consider finding $x_1$. Each column is examined from left to right for the number of pixels in the column (note the x projection of FIG. 8). When 5 pixels with value 1 are found in a column, the x value is presumed to be inside the character. Each proceeding columns are then examined in the reverse order (right to left) until a column with 2 or fewer pixels are found. At this point, the x value is presumed to have just left the character. Thus, the column to the right is presumed to be the first column in the character ($x_1$). The analogous processes are used to find the $x_2$, $y_1$ and $y_2$ values. The center points can then be computed from the above equations. The process ends at step 150.

APPENDIX I is the C code listing used for conversion of one circular arranged character pixel to one target character pixel.

Referring back to FIG. 7, viewed in conjunction with FIG. 9, the present polar conversion process using resolution enhancement is almost identical to the process described. The only differences between the process with resolution enhancement and the process of FIG. 7 is in steps 124 and 136. In step 124, $\Delta\theta/2$ is calculated as the spacing between adjacent radial columns of pixels instead of $\Delta\theta$ so that the spacing between radial lines 106 is half the distance of the previously described process. In step 136 the number of sample points per radial line are doubled (or otherwise increased). Otherwise, the process is identical. FIG. 9 illustrates how the resolution enhancement creates four pixels for each 1X1.27 radial area.

During the polar transformation, there is a loss of resolution due to the rounding off of address locations as well as the discrepancy between the area covered by the rotated pixels and the original pixels. To recover some of the resolution, sampling of the pixels can be carried out in smaller increments. The more sample points, the greater the accuracy but the more computation overhead incurred. A suitable balance was achieved by doubling the number of points in both the radial and angular directions to produce four pixels in the target image for each pixel in the original image. This was achieved by dividing $\Delta\theta$ by 2 and dividing the radial increment 2. This resulted in less round off error and increased accuracy in the target image.

Referring to FIG. 9, the shaded 1X1.27 area represents the target pixel if no resolution enhancement is used. This pixel would assume the value of the pixel located at its center point (481, 90) but obviously does not completely match the area represented by pixel (481,90). The enhanced target image samples the original image in four locations and therefore represents a composite of the pixels in the area, i.e. (481,90), (481,90), (480,90) and (481, 91).

In other words, the number of sample points along the length of radial lines 106 is doubled (or increased by a predetermined amount) and the number of radial lines 106 is also doubled (or increased by a predetermined amount). The result is an image which takes more samples of the pixel values of the circularly arranged character and thus more closely approximates (e.g. a stair step approximation) the image in a target array which has four times as many pixels. In the preferred embodiment, the resolution is doubled by sampling at the points shown in FIG. 4 as dots along the radial lines along with points between the dots and an additional point above the highest dot (or below the lowest). The resolution is then doubled again by sampling at another radial line between each of the radial lines shown plus an additional line at one end. This results in a quadrupling of the resolution of the original image.

In general, it is best to use as many sample points as possible. However, each additional sample point causes an increase in computation power required to perform the computation and causes the neural network to increase in complexity by one input node and the calculations resulting therefrom.

APPENDIX II is a listing of the C code used to perform the polar conversion in tests. This listing doubles the vertical resolution and doubles the horizontal resolution. This results in only two differences with APPENDIX I. In the lines computing delta-th and the last "for" statement, an additional factor of 2 divider and multiplier respectively are added to double the number of sampling points.

Many variations of the present invention are possible. For example, although the current embodiment of the neural networks is implemented on a digital computer in the form of a computer program, hardware implementations are also possible and likely as the availability and cost of neural network circuits becomes more attractive.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

APPENDIX I

```
MODE 1: ONE-TO-ONE PIXEL POLAR TRANSFORMATION
/*
-----------------------------------------------------------
     POLAR ADDRESS
     function      initialization for polar trans
*/
int   polar_addr(x0,y0,lr,lw,theta_0,theta_w,adr_x,adr_y)
int   x0,y0,lr,lw,theta_0,theta_w;
short adr_x[][32],adr_y[][32];
{
char   ch[80];
int    i,j,mx;
double theta,delt_th,d_cos,d_sin;
```

```
        delt_th = ASPECT / (double)lr;
        mx = (int)((double)theta_w * PI / 180.0 / delt_th + 0.5);
        printf("mx pixels = %d¥n",mx);
        theta = (double)theta_0 * PI / 180.0;
        for(i=0; i<mx; i++){
            d_cos = cos(theta);
            d_sin = sin(theta);
            for(j=0; j<lw*2; j++){
                adr_x[i][j] = x0 + (int)(d_cos*(lr+lw-j)/ASPECT + 0.5);
                adr_y[i][j] = y0 - (int)(d_sin*(lr+lw-j) + 0.5);
            }
            theta = theta - delt_th;
            printf(" horizontal = %d ¥r",i);
        }
        return(mx);
}
/*--------------------------------------------------------------*/
polar_trn(adr_x,adr_y,lw,no,buf,x0,y0)
short   adr_x[][32],adr_y[][32];
int     lw,no,x0,y0;
short   buf[][512];
{
int     i,j;
int     x,y;

for(i=0; i<no; i++){
            for(j=0; j<lw*2; j++){
                x = (int)adr_x[i][j];
                y = (int)adr_y[i][j];
                buf[j+y0][i+x0] = buf[y][x];
            }
        }
}
```

APPENDIX II

MODE 2:  SUB-PIXEL SAMPLING POLAR TRANSFORMATION

```
/*C-----------------------------------------------------------------
        Function:       calc_polar_addr()
        Description:    Calculates the addresses for the polar transform,
                        starting at theta_0 (measured CCW from 0 deg), and
                        proceeding CW to theta_w.  A four sub-pixel
                        transform is calculated, which is done by sampling
                        twice in the radial direction, and twice in the
                        angular direction.  Each sub-pixel sampling is
                        mapped to a full pixel, resulting in a four-times
                        size increase.
        Called by:      create_polar_addr()
        Arguments:      x0,y0   center coords of monitor
                        lr      radius length in y-direction pixels
                        lw      +/- width from radius of ring
                        theta_0,theta_w    start and range angles
                        adr_x,adr_y        memory location to store addresses
*/
int     calc_polar_addr(x0,y0,lr,lw,theta_0,theta_w,adr_x,adr_y)
int     x0,y0,lr,lw,theta_0,theta_w;
short   adr_x[RINGWD][ARCLEN],adr_y[RINGWD][ARCLEN];
{
char    ch[80];
int     i,j,mx;
double  theta,delt_th,d_cos,d_sin,rado;

delt_th = ASPECT / (double)lr/2;
        mx = (int)((double)theta_w * PI / 180.0 / delt_th + 0.5);
        printf("mx pixels = %d¥n",mx);
```

```
theta = (double)theta_0 * PI / 180.0;
theta -= 0.5*delt_th;     /* Adjust to center of pixel */
rado = lr+lw;
for(i=0; i<mx; i++){
    d_cos = cos(theta);
    d_sin = sin(theta);
    for(j=0; j<lw*2*2; j++){
        adr_x[j][i] = x0 + (int)(d_cos*(rado-(double)j/2)/ASPECT);
        adr_y[j][i] = y0 - (int)(d_sin*(rado-(double)j/2)       );
    }
    theta = theta - delt_th;
    printf(" horizontal = %d ¥r",i);
}
return(mx);
}
```

What is claimed is:

1. A method for transforming a circularly arranged character to a linearly arranged character, comprising the steps of:

generating a plurality of address locations for grey scale sampling pixel values making up said circularly arranged character, said address locations being arranged as a polar array of points formed by intersections of arcs and radial lines, said radial lines extending from a center point of the circle about which said circularly arranged character is arranged, and said arcs are constructed about said center point;

generating an address array storing addresses of said sampling points;

sampling said grey scale pixel values of said circularly arranged character, the number of sampling points being greater than the number of pixels making up the circularly arranged character, and wherein said radial lines are spaced by an integer divisor of the vertical height of a pixel and said arcs are spaced by an integer divisor of one horizontal width of a pixel;

storing said sampled grey scale pixel values in a target array;

constructing said linearly arranged character from the sampled values;

comparing said sampled pixel values with a reference value and assigning binary values to said pixel values on the basis of said comparison;

after said comparing step, finding a center of said linearly arranged character and finding an edge of said linearly arranged character;

wherein said step of generating address locations includes computing an address location as x and y coordinates and rounding said coordinate off to the nearest pixel address in the circularly arranged image; and applying said linearly arranged character to a neutral network.

* * * * *